United States Patent [19]
Dosaj

[11] Patent Number: 5,058,126
[45] Date of Patent: Oct. 15, 1991

[54] SILICON CARBIDE BEAM AS REFRACTORY IN AN OPEN-ARC FURNACE

[76] Inventor: Vishu D. Dosaj, 705 Sylvan La., Midland, Mich. 48640

[21] Appl. No.: 401,601

[22] Filed: Aug. 31, 1989

[51] Int. Cl.⁵ .............................................. F27D 1/00
[52] U.S. Cl. ........................................ 373/18; 373/75
[58] Field of Search .................... 373/18, 22, 24, 71, 373/73, 74, 75, 76

[56] References Cited

U.S. PATENT DOCUMENTS

| | | | |
|---|---|---|---|
| 3,783,171 | 1/1974 | Klein | 373/73 |
| 3,953,007 | 4/1976 | Laar. | |
| 3,973,076 | 8/1976 | Scott, Jr. et al. | 373/75 |
| 4,323,718 | 4/1982 | Buhring et al. | 373/73 |
| 4,434,495 | 2/1984 | Tomizawa et al. | 373/76 |
| 4,443,880 | 4/1984 | Buhler | 373/74 |
| 4,539,919 | 9/1985 | Bossetti. | |
| 4,569,660 | 2/1986 | Bossetti. | |
| 4,721,460 | 1/1988 | Bushman. | |
| 4,897,852 | 1/1990 | Dosaj | 373/22 |

Primary Examiner—Roy N. Envall, Jr.

[57] ABSTRACT

The instant invention relates to the use of hollow silicon carbide beams as refractory in substantially closed open-arc furnaces used for the carbothermic reduction of metal oxides. The silicon carbide beams are used in areas of the furnace which are exposed to temperatures higher than those tolerated by standard refractories, said areas requiring, in addition, stability to oxidation and reduction type chemical reactions and sufficient electrical resistance to minimize arcing from the exposed electrode. In addition, the invention relates to the use of silicon carbide beams in a two-stage, open-arc furnace for the carbothermic reduction of silicon dioxide to silicon metal.

18 Claims, 1 Drawing Sheet

SILICON CARBIDE BEAM AS REFRACTORY IN AN OPEN-ARC FURNACE

BACKGROUND OF THE INVENTION

An open-arc furnace can overcome disadvantages associated with the use of a submerged-arc furnace for the carbothermic reduction of metal oxides. However, the use of an open-arc furnace can place increased demands on the furnace's refractory. This invention relates to the use of hollow, recrystallized silicon carbide beams, as refractory, in areas of an open-arc furnace which require high temperature and chemical stability as well as resistance to electrical conduction.

The current practice of using a submerged-arc furnace for the carbothermic reduction of metal oxides, such as silicon dioxide to silicon metal, has been employed on a commercial basis for many years. It is generally recognized that there are several inherent disadvantages in the use of this practice. For example, in the present use of a submerged-arc furnace to produce silicon metal, silicon dioxide and carbonaceous reaction solids are charged to the top of the furnace. As the reaction progresses, a cavity forms at the bottom of the furnace at the lower end of the submerged electrode. The wall of this cavity is a crust consisting of partially melted quartz, silicon carbide, and partially converted carbon. Molten silicon collects at the bottom of the cavity. This cavitation and crusting process can contribute to poor heat and mass transfer.

The present submerged-arc furnace route to silicon is also hampered by mechanical problems. The flow of solids moving downward, counter-current to the flow of gases moving upward, inhibits the flow of solids to the reaction cavity. Additionally, solids are held up by bridging which is caused by the formation of the crust above the reaction cavity and the proximity of solids to the vertical electrodes. Bridging is also caused by the formation of sticky intermediates in the cooler upper portion of the furnace. This hold-up of solids necessitates the frequent opening of the furnace top for stoking of the solids to facilitate downward movement. In addition, the crust formation and bridging may block the escape of reactant gases which will build until a blow-out occurs. As the gases blow out from the furnace, reactant materials are carried with them. The need for egress of gases from the furnace and movement of the reactants downward into the reactant zone around the submerged-arc heat source requires careful and costly sizing of the feed materials.

Many of the problems associated with a submerged-arc furnace can be overcome by using a non-submerged arc as a heat source. For example, gas buildup and blowout around the probe used to create the submerged arc is no longer a problem. Therefore, fines, such as sand, can be used as feed stock for the smelting process. In addition, less stringent sizing requirements for the feed stock is required. This, results in reduced cost of raw materials used in the process.

However, the use of an open-arc furnace for the carbothermic reduction of metal oxides places increased demands on the furnace refractory. The open arc causes increased vaporization of the reactants and creates the potential for their loss from the furnace. Therefore, for efficiency and environmental reasons, it is advantageous to at least partially close the furnace. This results in higher temperatures in the furnace and places additional demands on refractory materials.

Another potential problem incurred with the use of an open-arc energy source is that of arcing to the furnace walls. In general, it is desirable to maintain the electrical resistance of the feed materials to the furnace as high as possible to facilitate energy utilization. When the arc is submerged, the high resistance feed materials serve as an insulator to prevent the probe from arcing to lower resistance refractory lining the walls of the furnace. However, when the cathode is not submerged and the arc is open, there is a pronounced tendency for the arc to jump from the sides of the cathode to the refractory walls of the furnace. Therefore, it is necessary that the refractory have sufficient electrical resistivity to minimize this arcing. Arcing to the sides of the furnace can result in increased cathode probe wear as well as destruction of the refractory material. The destruction of the refractory material creates a safety hazard as well as contamination of the tapped metal.

An additional potential problem associated with a closed or partially closed furnace used in a carbothermic reductive process, is the increased exposure of refractory materials to reductive and oxidative gases at elevated temperatures. For example, retained carbon monoxide can react with metal oxide refractories to reduce them to lower melting metals and byproduct $CO_2$.

All of these potential problems create the need for specialized refractory materials in substantially closed open-arc furnaces for the carbothermic reduction of metal oxides. Silicon carbide beams possess many of the characteristic required of a refractory to overcome the aforementioned refractory problems created by the use of an open arc in a closed or partially closed silicon smelting furnace.

The two-stage furnace described in one embodiment of the instant invention has previously been described by Dosaj et al., co-pending U.S. Pat. No. 07/239,144, filed Aug. 31, 1988.

SUMMARY OF INVENTION

The instant invention relates to the use of hollow silicon carbide beams as refractory in substantially closed open-arc furnaces used for carbothermic reduction of metal oxides. More specifically, silicon carbide beams are used in areas of the furnace which are exposed to temperatures higher than those tolerated by standard refractory, said areas requiring chemical stability to oxidation and reduction type reactions, and said areas requiring sufficient electrical resistance to minimize arcing from the exposed electrode. In addition, the invention relates to the use of silicon carbide beams in a two-staged furnace employing a transferred-arc plasma for the carbothermic reduction of silicon dioxide to silicon metal.

DESCRIPTION OF THE DRAWING

Figure 1:
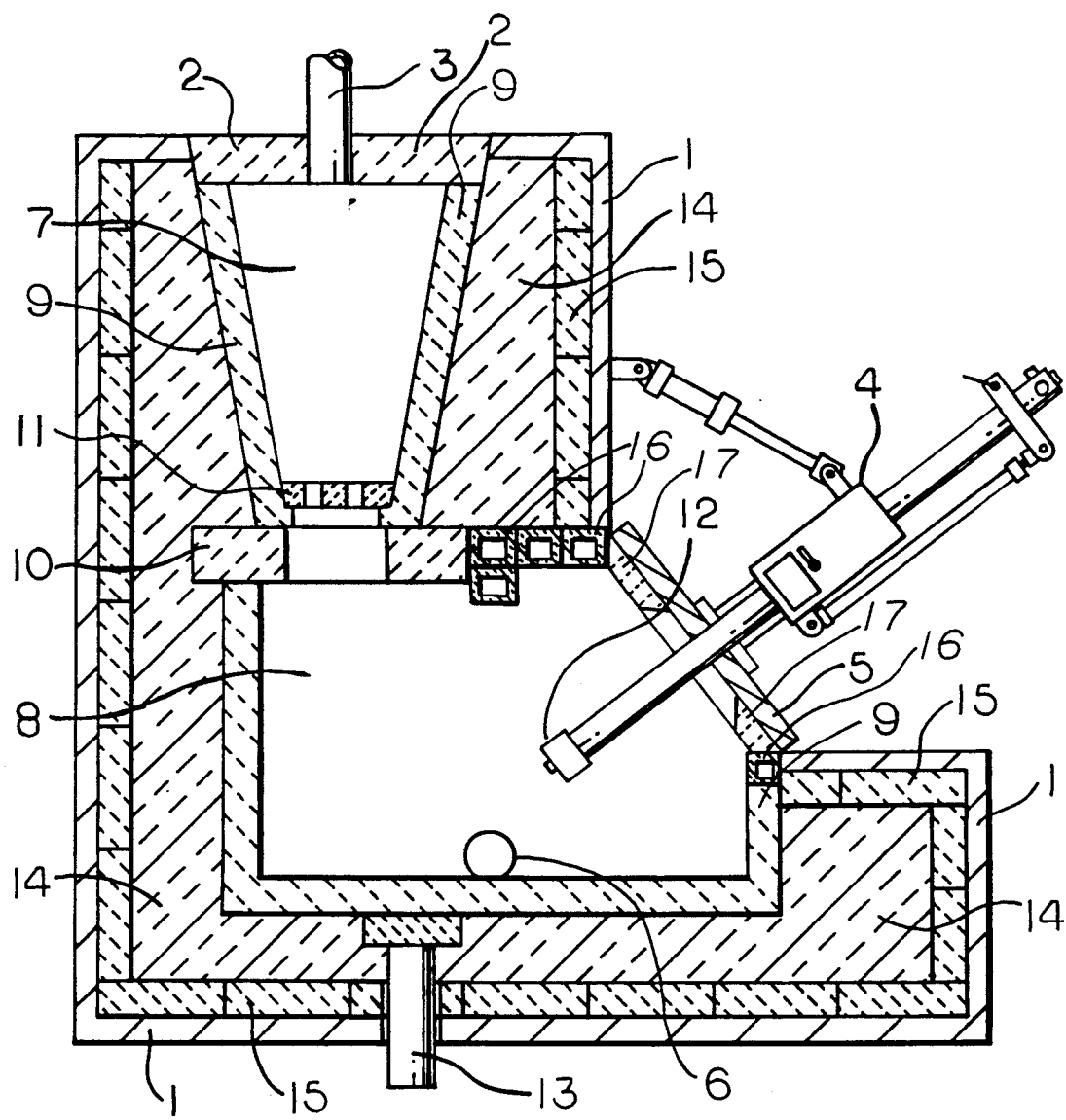
FIG. 1 is a cross-sectional view of an example of a two-stage, closed, open arc furnace containing hollow silicon carbide beams as a refractory.

In FIG. 1, an assembled two-stage furnace is shown enclosed by a steel shell 1. The furnace consists of a lower first stage furnace body 8 and an upper second stage shaft 7. An electric energy source, assembly 4, enters the first stage 8 at the end of the furnace body opposite the shaft through a stainless steel water-cooled panel 5.

The water-cooled panel 5 is supported by a chromealumina plate 17. Hollow silicon carbide refractory beams 16 interface with support plate 17 and insulate the energy source 4 from higher electrical conductive materials.

The second stage shaft 7 and the furnace body 8 are lined with carbon paste 9. The second stage shaft 7 is a truncated cone which is supported above the furnace body 8 by graphite blocks 10.

Cover 2 is in place on the second stage shaft 7 to keep the system closed during furnace operation. The cover 2 is connected by a gas outlet line 3 to removing the remaining by-produced gases from the furnace. The cover 2 is disconnected at gas outlet line 3 and removed for loading of feed materials to the lower first stage.

A graphite support plate 11 is positioned at the bottom of the second stage shaft. The graphite plate 11 retains particulates in the second stage 7 so gases evolved from the reaction in the first stage 8 can pass through the particulates and react with them. At the end of an operating cycle, the support plate 11 is broken with a stoking rod allowing the particulates of the second stage 7 to pass into the first stage 8 of the furnace. Additional materials to be charged to the furnace are placed into the second stage shaft 7 and allowed to pass into the first stage 8.

An anode 13 is positioned at the bottom of the first stage 8. Molten silicon is removed from the first stage 8 via a tapping spout 6.

The furnace body 8 and shaft 7 are enclosed from inside to outside, by first a layer of chrome-alumina refractory 14. This layer of refractory is followed by a layer of insulating brick 15. The entire assembly is then encased by the steel shell 1.

DESCRIPTION OF THE INVENTION

The instant invention is an open-arc furnace for the carbothermic reduction of metal oxides. In one embodiment, the furnace comprises:

(A) a furnace body, the furnace body being a substantially closed vessel, defining a reaction zone for containing solid reactants and molten metal;

(B) an open-arc energy source, the energy source being fit into the furnace body through an opening in the furnace body;

(C) an anode for the energy source, the anode being positioned within the furnace body;

(D) a silicon carbide beam, the silicon carbide beam being used as a first refractory material in high temperature exposed areas of the furnace body, said exposed areas requiring resistance to reductive and oxidative processes, and sufficient electrical resistance to prevent arcing from the energy source; and (E) means for collecting molten metal, the means being implemented at an opening in the furnace body, the opening being in the lower portion of the furnace body.

The instant invention relates to the use of silicon carbide beams as a refractory in an open-arc furnace used in the carbothermic reduction of metal oxides. The metal oxides can be, for example, oxides of iron, silicon, manganese, and chromium.

The furnace body can be of similar design to that known in the art for the carbothermic reduction of metal oxides to metals. The furnace body can be of a similar design as the furnace body 8 of FIG. 1. The furnace body of the instant invention is a substantially closed vessel defining a reaction zone for containing solid reactants and molten metal. By substantially closed, is meant the furnace body has a roof capable of retaining byproduct vapors within the furnace body. The inside of the roof can be lined with standard refractory materials such as chrome-alumina, magnesia, and alumina-silica. The roof may contain one or more occludable apertures for adding feed materials to the reactor and through which byproduct gases may be channeled or removed from the furnace.

An open-arc energy source is fitted into the furnace body through an opening in the furnace body. The energy source is located above and separate from solid and liquid reactants, intermediates, and products so as to allow production of an open arc between the energy source and solid reactants. The energy source can be known means such as, for example, a graphite electrode or a transferred-arc plasma torch, either source coupled with an anode within the furnace body. The electricity utilized by the energy source can be direct current or single phase alternating current. The preferred energy source is a direct current graphite electrode. When a transferred-arc plasma torch is used, the plasma gas can be, for example, argon, hydrogen, or mixtures thereof. To effect efficient transfer of thermal energy within the furnace, it is preferred that the electrode or plasma torch should be movably mounted within the furnace body.

In the furnace of the instant invention, one or more silicon carbide beams are used as a refractory material within certain critical areas of the furnace. By critical areas, is meant exposed refractory surfaces of the inside of an open-arc furnace which are subjected to temperatures above about 1800° C.; where the refractory surface can be subjected to oxidative and reductive processes causing deterioration of the surface; and where the refractory surface is within a distance of the energy source such that electrical arcing can occur between the energy source and the refractory surface. Exposed surfaces are those which are not typically covered by feed materials or molten metal during the carbothermic reductive process.

The term refractory refers to any, inorganic, nonmetallic, heat-resistant material that provides the structure and/or lining for a high temperature furnace.

The silicon carbide beam can be hollow or solid. Preferred is a hollow beam. When the beam is hollow, it may be filled with refractory materials of a similar coefficient of expansion, for example, powdered carbon and silicon carbide. By similar coefficient of expansion is meant, any material that will not cause cracking of the silicon carbide beam during heating and cooling of the beam. Preferred are refractory materials having a coefficient of expansion that is less than about 1.1 times silicon carbide's coefficient of expansion. The fill materials can be of any physical size and shape that can fit into the void of the beam, for example, powder, flake, or chunks.

The cross-sectional configuration of the silicon carbide beam can be of any convenient geometry. The cross-section configuration can be, for example, a triangle, square, rectangle, trapezoid, or octagon. Preferred is a square or rectangular configuration. More preferred is a silicon carbide beam with about a 2 in. by 1.5 in. cross-section and about 0.25 in. thickness of the silicon carbide.

The number of silicon carbide beams used and their location within the furnace will depend upon the particular configuration of the furnace as well as the size and shape of the silicon carbide beams.

The actual process for forming the silicon carbide beams is not critical as long as the beams possess adequate chemical, physical, and electrical properties for use in an open-arc carbothermic reduction furnace. Preferred is a silicon carbide beam formed by a slip-casting technique. More preferred is a silicon carbide beam, formed by a slip-casting technique, having physical characteristics within the range presented in Table 1.

TABLE 1

| Physical Characteristics of Silicon Carbide Beams | |
|---|---|
| Bulk Density | 2.7–3.1 g/cm$^3$ |
| Thermal Expansion Coefficient | 3.9–4.6 × $10^{-6}$/°C. |
| Thermal Conductivity | 0.07–0.19 cal/cm sec °C. |
| Electrical Resistivity | $10-10^3$ ohms-cm |

Means for collecting molten silicon can be such conventional means as, for example, batch or continuous tapping. Means for collecting molten silicon could be effected, for example, at an opening in the bottom of the furnace body or at a location low in a wall of the furnace body.

A second embodiment of the instant invention is an improved two-stage, open-arc furnace for the carbothermic production of silicon metal. FIG. 1 is an example of a furnace useful in this type of process. The furnace of this embodiment comprises:

(A) a furnace body, the furnace body being a substantially closed vessel, defining a reaction zone for containing solid reactants and molten silicon;

(B) an energy source, the energy source being fit into the furnace body through a first opening in the furnace body;

(C) an anode for the energy source, the anode being positioned within the furnace body;

(D) a shaft suitable for containing solid particulates of carbon and suitable for passing gases from the furnace body through the shaft, the shaft being attached to the furnace body at a second opening in the furnace body;

(E) means for supporting solid particulates, the means for supporting solid particulates being positioned at the bottom of the shaft, the means for supporting solid particulates being capable of allowing gas to pass from the furnace body up through the shaft;

(F) a silicon carbide beam, the silicon carbide beam being used as a first refractory material in high temperature exposed areas of the furnace body, said exposed areas requiring resistance to reductive and oxidative processes, and sufficient electrical resistance to prevent arcing from the energy source; and (G) means for collecting molten silicon, the means being implemented at a third opening in the furnace body, the opening being in the lower portion of the furnace body.

The configuration of the open-arc furnace of the instant invention facilitates efficient operation of a two-step process in which silicon carbide is prepared concurrently but in a carbon bed separated from the reaction zone of the furnace where molten silicon is formed. An attached shaft for containing a bed of carbon facilitates contact of the by-produced gases from the reaction zone, minimized loss of heat, and facilitates mixing of resultant silicon carbide with silicon dioxide and charging to the reaction zone of the furnace by standard stoking techniques. Introducing the energy source into a wall of the furnace body facilitates location of the shaft above the furnace body.

The furnace body of the instant invention is a substantially closed vessel defining a reaction zone for containing solid reactants and molten silicon metal. By substantially closed, is meant the furnace body has a roof capable of retaining byproduct gases within the furnace body. The inside of the roof can be lined with standard refractory materials such as chrome-alumina, magnesia, and aluminasilica. The roof of the furnace may contain one or more occludable apertures for adding feed materials to the reactor and through which byproduct gases may be channeled or removed from the reactor.

An open-arc energy source is fitted into the furnace body through an opening in the furnace body. The energy source is located above and separate from solid and liquid reactants, intermediates, and products so as to allow production of an open arc between the energy source and solid reactants. The energy source can be known means such as, for example, a graphite electrode or a transferred-arc plasma torch, either source coupled with an anode within the furnace body. The electricity utilized by the energy source can be direct current or single phase alternating current. The preferred energy source is a direct current graphite electrode. When the energy source is a transferred-arc plasma torch, the plasma gas can be, for example, argon, hydrogen, or mixtures thereof. To effect efficient transfer of thermal energy within the furnace, it is preferred that the electrode or plasma torch should be movably mounted within the furnace body.

The shaft which is positioned above the furnace body can be any vertical, open configuration such as, for example, a cylinder, a shaft with a square or rectangular cross-section, a structure with sloping sides such as a truncated cone. A truncated cone is a Preferred configuration for the shaft. The height, "H", and diameter, "D", of the shaft will depend upon such known factors as (1) particle size of the solids within the shaft (2) relative height and cross-sectional area of the shaft (3) required residence times of gases within the shaft to achieve efficient conversion of SiO to SiC. A minimum H/D ratio must be maintained to reduce channeling of gases through the bed of solids to assure sufficient contact of gaseous SiO with the solid carbon particles. The inventors believe that a shaft H/D ratio in the range of from about 0.1 to 10 is effective for the instant invention.

The means for supporting solid particulates of carbon can be any conventional means which will effectively hold the solids while allowing byproduct gases from the furnace body to pass up through the shaft. Such conventional means can be, for example, a perforated plate.

In the two-stage furnace of the instant invention, one or more silicon carbide beams are used as a refractory material within certain critical areas of the furnace. By critical areas, is meant exposed refractory surfaces of the inside of an open-arc furnace subjected to temperatures above about 1800° C.; where the refractory surface can be subjected to oxidative and reductive processes causing deterioration of the surface; and where the refractory surface is within a distance of the energy source such that electrical arcing can occur between the energy source and the refractory lining. Exposed surfaces are those which are not typically covered by feed materials or molten metal during the carbothermic reductive process.

The term refractory refers to any, inorganic, non-metallic, heat-resistant material that provides the structure and/or lining for a high temperature furnace.

The silicon carbide beam can be hollow or solid. Preferred is a hollow beam. When the beam is hollow, it may be filled with refractory materials of a similar coefficient of expansion, for example, powdered carbon and silicon carbide. By similar coefficient of expansion is meant, any material that will not cause cracking of the silicon carbide beam during heating and cooling of the beam. Preferred are refractory materials having a coefficient of expansion that is less than about 1.1 times silicon carbide's coefficient of expansion. The fill materials can be of any physical size and shape that can fit into the void of the beam, for example, powder, flake, or chunks.

The cross-sectional configuration of the silicon carbide beam can be of any convenient geometry. The cross-section configuration could be, for example, a triangle, square, rectangle, trapezoid, or octagon. Preferred is a square or rectangular configuration. More preferred is a silicon carbide beam with about a 2 in. by 1.5 in. cross-sectional and about 0.25 in. thickness of the silicon carbide.

The number of silicon beams used and their location within the furnace will depend upon the particular configuration of the furnace as well as the size and shape of the silicon carbide beam. FIG. 1 shows a preferred location for silicon carbide beams in the particular furnace embodiment illustrated.

The actual process for forming the silicon carbide beams is not critical as long as the beams possess adequate chemical, physical, and electrical properties for use in an open-arc carbothermic reduction-type furnace. Preferred are silicon carbide beams formed by a slip-casting technique. More preferred are silicon carbide beams formed by a slip-casting technique having characteristic within the range presented in Table 1, supra.

Means for collecting molten silicon can be such conventional means as, for example, batch or continuous tapping. Means for collecting molten silicon can be effected, for example, at an opening in the bottom of the furnace body or at a location low in a wall of the furnace body.

So that those skilled in the art may better understand and appreciate the instant invention, the following examples are presented. These examples are presented to be illustrative and are not to be construed as limiting the claims delineated herein.

EXAMPLE 1

A control run was conducted using a two-staged, open-arc, silicon smelting furnace similar in configuration to that of FIG. 1, but without the silicon carbide refractory beams.

The furnace operation was started by the ignition of the transferred-arc plasma torch. The argon flow rate to the plasma torch was 900 liters per hour. The reactor was allowed to heat up for 8 hours before raw materials were charged to it.

Stage one of the furnace was charged with an equimolar mixture of quartz and silicon carbide. Two mole equivalents of charcoal per mole of quartz added to stage 1 were placed in the shaft of Stage 2 on a graphite distributor plate. The Weights of the raw materials were established to properly fill the volumes of the plasma and the shaft zones.

The furnace was charged with fresh raw materials at 5.5, 16, and 24 hours of operation. Molten silicon metal was tapped from the furnace at 23, 32, and 34 hours after the initial charging of the furnace. The furnace had to be shut down due to plugging of the tap hole.

The furnace was allowed to cool down and then opened for excavation and visual evaluation. Visual observation revealed the refractory backing the torch plate was completely melted and the chrome-alumina refractory brick above the torch was partially consumed. The weight of the consumed refractory was estimated to be about 43 kg. The tapping spout was plugged with solidified refractory which had prevented efficient flow of the silicon from the furnace during tapping.

EXAMPLE 2

A control run was conducted using a two-stage, open-arc, silicon smelting furnace similar in configuration to that of FIG. 1 using graphite as a refractory. In this run, the chrome-alumina brick above the torch port was replaced with graphite blocks, the refractory face shielding the torch plate was covered with graphite felt, and the tapping spout hole was enlarged.

The first stage of the furnace was loaded with an equimolar mixture of quartz and silicon carbide. A stoichiometric mixture of two moles of charcoal for each mole of silica was placed in the second stage of the furnace. After 6.5 hours of operation, the converted raw materials from the shaft zone were stoked into the first stage. A new graphite distributor plate was installed in the furnace and the shaft of the second stage was filled with two moles equivalent of charcoal. Additional quartz was added to the first stage.

The furnace was run for a total of 16 hours during which time a total of 4.2 kg of silicon metal was tapped. During the run, three torches had to be replaced as a result of side arcing to the graphite employed as a refractory. In addition, approximately 25 kg of the chrome-alumina refractory brick above the torch plate was consumed. The graphite blocks above the torch plate had been partially consumed by reaction with SiO and showed signs of electrical arcing.

EXAMPLE 3

A run was conducted using a two-stage, open-arc, silicon smelting furnace similar in configuration to that of FIG. 1. Silicon carbide refractory beams were used in exposed areas of the reactor subject to electrical arcing.

The furnace in this run was further modified over that of Examples 1 and 2 by reducing the thickness of the carbon lining in stage 1 from 380 mm to 350 mm. The first stage of the furnace was loaded with an equimolar ratio of silicon dioxide and silicon carbide. Two moles of carbon were added to the shaft of the second stage per mole of silicon dioxide added to the first stage.

The furnace was ran for a total of 68 hours, with periodic stoking of the converted material from the second stage to the first stage, replacement of the carbon in the second stage, and adjustment of the carbon levels to maintain a carbon theory in the first stage of 90–95%.

A total of 41 kg of silicon metal was tapped from the furnace during the 68 hour run. Silicon recovery was about 91% under stable operating conditions and the energy consumption was about 54 kwh/kg silicon. No torches were damaged due to side arcing and there was no visible deterioration of the silicon carbide beams.

What is claimed is:

1. An open-arc furnace for the carbothermic reduction of metal oxides, the furnace comprising:
   (A) a furnace body, the furnace body being a substantially closed vessel, defining a reaction zone for containing solid reactants and molten metal;
   (B) an energy source, the energy source being fit into the furnace body through a first opening in the furnace body;
   (C) an anode for the energy source, the anode being positioned within the furnace body;
   (D) a silicon carbide beam, the silicon carbide beam being used as a first refractory material in high temperature, exposed, areas of the furnace body, said exposed areas requiring resistance to reductive and oxidative processes, and sufficient electrical resistance to prevent arcing from the energy source; and
   (E) means for collecting molten metal, the means being implemented at an opening in the furnace body, the opening being in the lower portion of the furnace body.

2. The open-arc furnace of claim 1, where the energy source is an open electric-arc from a graphite electrode.

3. The open-arc furnace of claim 1, where the energy source is an open-arc plasma from a transferred-arc plasma torch.

4. The open-arc furnace of claim 1, where the silicon carbide beam is hollow.

5. The open-arc furnace of claim 4, where the hollow silicon carbide beam is filled with a second refractory material having a coefficient of expansion that is less than about 1.1 times silicon carbide's coefficient of expansion.

6. The open-arc furnace of claim 5, where the second refractory material is carbon.

7. The open-arc furnace of claim 1, where the energy source is a transferred-arc plasma torch, more than one silicon carbide beam is present, and the silicon carbide beams are hollow.

8. The open-arc furnace of claim 1, where the energy source is a graphite electrode, more than one silicon carbide beam is present, and the silicon carbide beams ar hollow.

9. The open-arc furnace of claim 1, where the silicon carbide beam is formed from slip-cast silicon carbide.

10. A two-stage, open-arc, furnace for the carbothermic production of silicon metal, the furnace comprising:
   (A) a furnace body, the furnace body being a substantially closed vessel, defining a reaction zone for containing solid reactants and molten silicon;
   (B) an energy source, the energy source being fit into the furnace body through a first opening in the furnace body;
   (C) an anode for the energy source, the anode being positioned within the furnace body;
   (D) a shaft suitable for containing solid particulates and suitable for passing gases from the furnace body through the shaft, the shaft being attached to the top of the furnace body at a second opening in the furnace body;
   (E) means for supporting solid particulates, the means for supporting solid particulates being positioned at the bottom of the shaft, the means for supporting solid particulates being capable of allowing gas to pass from the furnace body up through the shaft;
   (F) a silicon carbide beam, the silicon carbide beam being used as a first refractory material in high temperature exposed areas of the furnace body, said exposed areas requiring resistance to reductive and oxidative processes, and sufficient electrical resistance to prevent arcing from the energy source; and
   (G) means for collecting molten silicon, the means being implemented at a third opening in the furnace body, the opening being in the lower portion of the furnace body.

11. The open-arc furnace of claim 10, where the energy source is an open electric-arc from a graphite electrode.

12. The open-arc furnace of claim 10, where the energy source is an open-arc plasma from a transferred-arc plasma torch.

13. The open-arc furnace of claim 10, where the silicon carbide beam is hollow.

14. The open-arc furnace of claim 13, where the hollow silicon carbide beam is filled with a second refractory material having a coefficient of expansion that is less than about 1.1 times silicon carbide's coefficient of expansion.

15. The open-arc furnace of claim 14, where the second refractory material is carbon.

16. The open-arc furnace of claim 10, where the energy source is a transferred-arc plasma torch, more than one silicon carbide beam is present, and the silicon carbide beams are hollow.

17. The open-arc furnace of claim 10, where the energy source is a graphite electrode, more than one silicon carbide beam is present, and the silicon carbide beams are hollow.

18. The open-arc furnace of claim 10, where the silicon carbide beam is formed from slip-cast silicon carbide.

* * * * *